(12) United States Patent
Nishimura

(10) Patent No.: US 9,720,193 B2
(45) Date of Patent: Aug. 1, 2017

(54) OPTICAL-CONNECTOR FIXING MEMBER, OPTICAL CONNECTOR, AND OPTICAL CONNECTOR DEVICE

(71) Applicant: FUJIKURA LTD., Koto-ku, Tokyo (JP)

(72) Inventor: Akito Nishimura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/955,849

(22) Filed: Dec. 1, 2015

(65) Prior Publication Data

US 2016/0161688 A1 Jun. 9, 2016

(30) Foreign Application Priority Data

Dec. 4, 2014 (JP) ................................ 2014-246200

(51) Int. Cl.
- *G02B 6/36* (2006.01)
- *G02B 6/42* (2006.01)
- *G02B 6/38* (2006.01)

(52) U.S. Cl.
CPC .......... *G02B 6/4292* (2013.01); *G02B 6/3882* (2013.01); *G02B 6/3885* (2013.01); *G02B 6/3897* (2013.01)

(58) Field of Classification Search
CPC ....... G02B 6/3898; B25B 27/00; B25B 27/06; B25B 5/06
USPC .......................................... 385/134, 147, 88
See application file for complete search history.

(56) References Cited

U.S. PATENT DOCUMENTS

| | | | | |
|---|---|---|---|---|
| 5,774,611 A * | 6/1998 | Nagase | ................ | G02B 6/3825 385/58 |
| 6,095,695 A * | 8/2000 | Ohtsuka | ............... | G02B 6/3825 385/134 |
| 6,572,275 B2 * | 6/2003 | Shimoji | ............... | G02B 6/3821 385/56 |
| 6,880,979 B2 * | 4/2005 | Cox | ..................... | G02B 6/3821 385/76 |
| 7,020,376 B1 * | 3/2006 | Dang | ........................ | B25B 9/02 385/135 |
| 7,194,178 B2 * | 3/2007 | Nakano | ................ | G02B 6/3898 385/134 |
| 7,534,128 B2 * | 5/2009 | Caveney | ................ | H01R 43/26 29/764 |
| 8,855,458 B2 * | 10/2014 | Belenkiy | .............. | G02B 6/3898 385/137 |

(Continued)

*Primary Examiner* — Ellen Kim
(74) *Attorney, Agent, or Firm* — Osha Liang LLP

(57) ABSTRACT

Disclosed is an optical-connector fixing member including: an upper plate part for pressing, toward a receptacle provided on a substrate, a ferrule that holds an end section of an optical fiber; and a pair of engagement side plate parts formed so as to extend from the upper plate part toward the substrate, each engagement side plate part having a connector-side engagement section that engages with a receptacle-side engagement section formed on a side surface of the receptacle. An engaged state in which the connector-side engagement section is engaged with the receptacle-side engagement section is releasable by inserting an end section of a tool into a gap between each engagement side plate part and a member that is arranged between the pair of engagement side plate parts, and spreading each engagement side plate part outward.

4 Claims, 5 Drawing Sheets

(56) References Cited

U.S. PATENT DOCUMENTS

2004/0218885 A1* 11/2004 Segroves ................ B25B 7/12
　　　　　　　　　　　　　　　　　　　　　　　385/134
2010/0135618 A1　　6/2010　Howard et al.

* cited by examiner

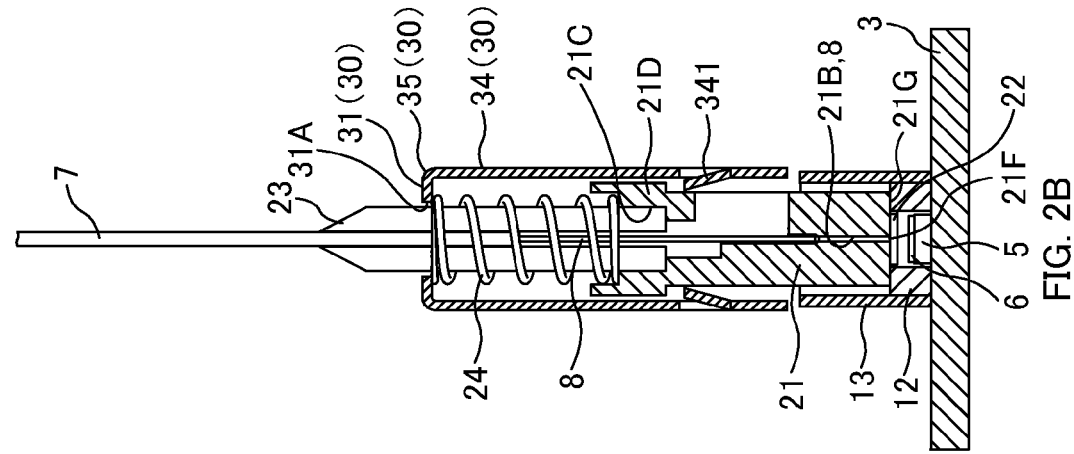
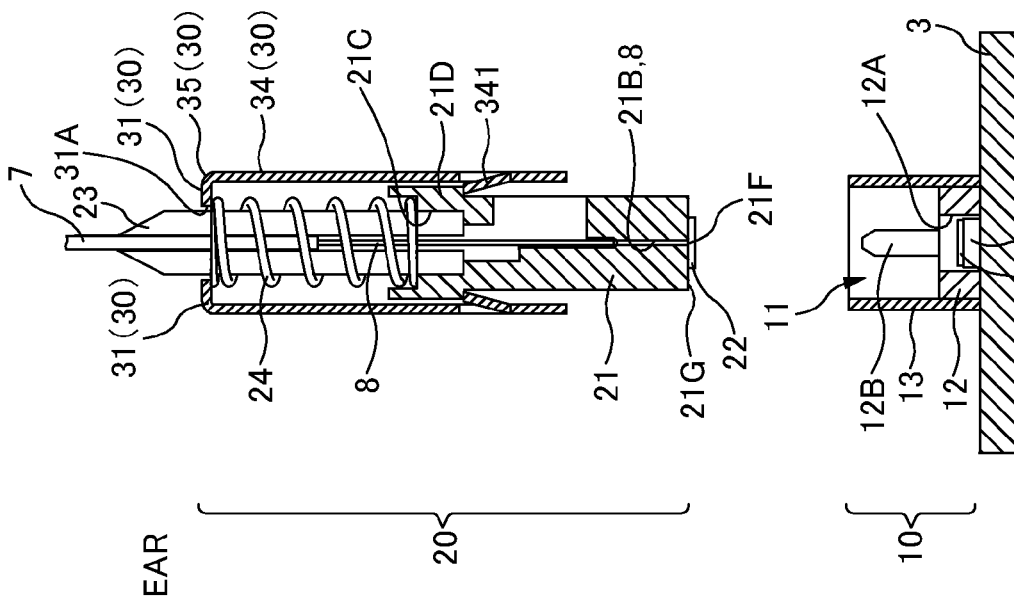
FIG. 2A
FIG. 2B

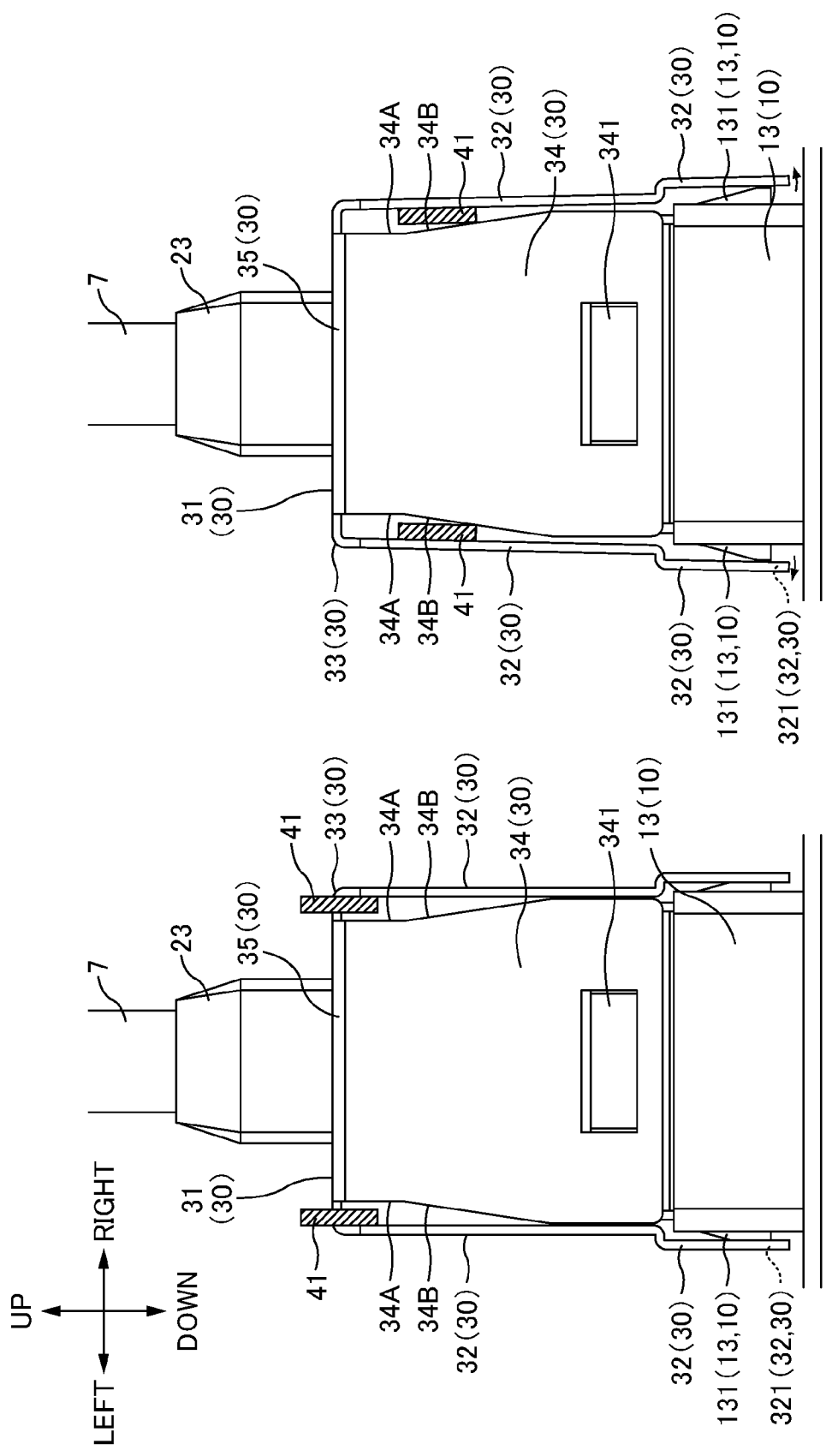

OPTICAL-CONNECTOR FIXING MEMBER, OPTICAL CONNECTOR, AND OPTICAL CONNECTOR DEVICE

TECHNICAL FIELD

The present invention relates to an optical-connector fixing member, an optical connector, and an optical connector device.

BACKGROUND ART

A technique known in the art involves positioning a ferrule, which holds an end section of an optical fiber, with respect to a receptacle, which is provided on a substrate, by means of positioning sections (a positioning pin and a positioning hole), and thereby optically connecting the optical fiber and a photoelectric conversion element provided on the substrate. For example, Patent Literature 1 discloses a technique in which a ferrule (reference number 20 in Patent Literature 1) and a receptacle (reference number 80 in Patent Literature 1) provided on a substrate are positioned with respect to one another to optically connect an optical fiber and a photoelectric conversion element provided on the substrate.

In Patent Literature 1, the ferrule is fixed by fixing a fixing member (reference number 60 in Patent Literature 1) which houses the ferrule to the receptacle. Thus, to remove the ferrule from the receptacle, it is necessary to disengage the fixing member from the receptacle. If, however, there are other members (e.g. elements mounted on the substrate) around the receptacle, it may be difficult to release the engaged state by outwardly spreading the fixing member's engagement section which is in engagement with the receptacle. On the other hand, providing a space around the receptacle to facilitate releasing the engaged state will prevent elements from being laid out on the substrate at high densities.

An objective of the present invention is to provide a fixing member whose engaged state can be released easily in a small space.

CITATION LIST

Patent Literature

Patent Literature 1: US 2010/0135618 A1

SUMMARY OF INVENTION

A primary aspect of the invention is an optical-connector fixing member including: an upper plate part for pressing, toward a receptacle provided on a substrate, a ferrule that holds an end section of an optical fiber; and a pair of engagement side plate parts formed so as to extend from the upper plate part toward the substrate, each engagement side plate part having a connector-side engagement section that engages with a receptacle-side engagement section formed on a side surface of the receptacle, wherein an engaged state in which the connector-side engagement section is engaged with the receptacle-side engagement section is releasable by inserting an end section of a tool into a gap between each engagement side plate part and a member that is arranged between the pair of engagement side plate parts, and spreading each engagement side plate part outward.

Other features of the present invention are made clear by the Specification and Drawings below.

With the present invention, the engaged state of a fixing member can be released easily in a small space.

BRIEF DESCRIPTION OF DRAWINGS

FIGS. 1A and 1B are perspective views of an optical connector device 1, wherein FIG. 1A is a perspective view before connection of an optical connector 20, and FIG. 1B is a perspective view when the optical connector 20 has been connected.

FIGS. 2A and 2B are cross-sectional views of the optical connector device 1, wherein FIG. 2A is a cross-sectional view before connection of the optical connector 20, and FIG. 2B is a cross-sectional view when the optical connector 20 has been connected.

FIGS. 4A and 4B are conceptual diagrams of the respective positions of release claws 41 of the removal tool 40 (tip end sections of the release claws 41) as viewed from the front side, wherein FIG. 4A is a conceptual diagram illustrating how each release claw 41 of the removal tool 40 is inserted into a gap on the inner side of each first side plate part 32 of the optical connector 20, and FIG. 4B is a conceptual diagram illustrating how the engaged state is released by spreading each first side plate part 32 outward from the inner side of the first side plate part 32 by each release claw 41 of the removal tool 40.

DESCRIPTION OF PREFERRED EMBODIMENTS

Figure 1B:
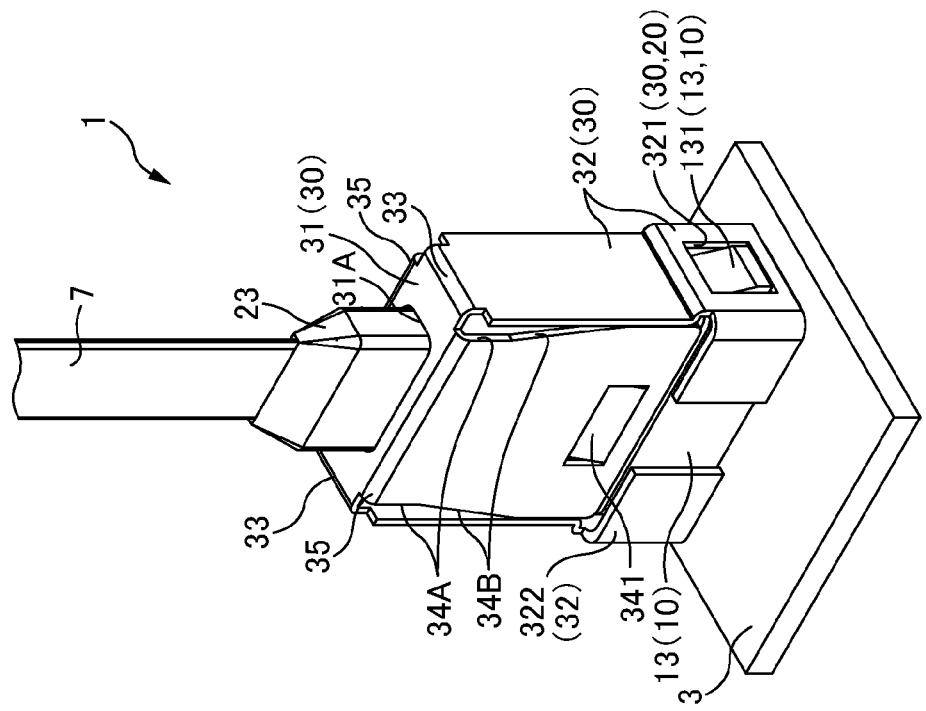

At least the following matters are made clear from the following disclosure of the Specification and Drawings.

Disclosed is an optical-connector fixing member including: an upper plate part for pressing, toward a receptacle provided on a substrate, a ferrule that holds an end section of an optical fiber; and a pair of engagement side plate parts formed so as to extend from the upper plate part toward the substrate, each engagement side plate part having a connector-side engagement section that engages with a receptacle-side engagement section formed on a side surface of the receptacle, wherein an engaged state in which the connector-side engagement section is engaged with the receptacle-side engagement section is releasable by inserting an end section of a tool into a gap between each engagement side plate part and a member that is arranged between the pair of engagement side plate parts, and spreading each engagement side plate part outward. With this optical-connector fixing member, the engaged state of the fixing member can be released easily in a small space.

Preferably, the aforementioned gap becomes narrower toward the substrate. Thus, by sliding the end section of the tool, which has been inserted into the gap, toward the substrate, the engagement side plate parts can be spread outward and the engaged state can be released.

Also disclosed is an optical connector including: a ferrule that holds an end section of an optical fiber; and a fixing member that fixes the ferrule in a state where the ferrule is arranged between the fixing member and a receptacle provided on a substrate, wherein: the fixing member includes an upper plate part for pressing the ferrule toward the receptacle, and a pair of engagement side plate parts formed so as to extend from the upper plate part toward the substrate, each engagement side plate part having a connector-side engagement section that engages with a receptacle-side engagement section formed on a side surface of the receptacle; and an engaged state in which the connector-side engagement section is engaged with the receptacle-side engagement section is releasable by inserting an end section of a tool into a gap between each engagement side plate part and a member that is arranged between the pair of engagement side plate parts, and spreading each engagement side plate part outward. With this optical connector, the engaged state of the fixing member can be released easily in a small space.

Also disclosed is an optical connector device including: a receptacle to be attached onto a substrate; and an optical connector that is attachable to and detachable from the receptacle, wherein: the optical connector includes a ferrule that holds an end section of an optical fiber, and a fixing member that fixes the ferrule in a state where the ferrule is arranged between the fixing member and the receptacle provided on a substrate; the fixing member includes an upper plate part for pressing the ferrule toward the receptacle, and a pair of engagement side plate parts formed so as to extend from the upper plate part toward the substrate, each engagement side plate part having a connector-side engagement section that engages with a receptacle-side engagement section formed on a side surface of the receptacle; and an engaged state in which the connector-side engagement section is engaged with the receptacle-side engagement section is releasable by inserting an end section of a tool into a gap between each engagement side plate part and a member that is arranged between the pair of engagement side plate parts, and spreading each engagement side plate part outward. With this optical connector device, the engaged state of the fixing member can be released easily in a small space.

Embodiments:

{Overall Configuration}

Figure 1A:
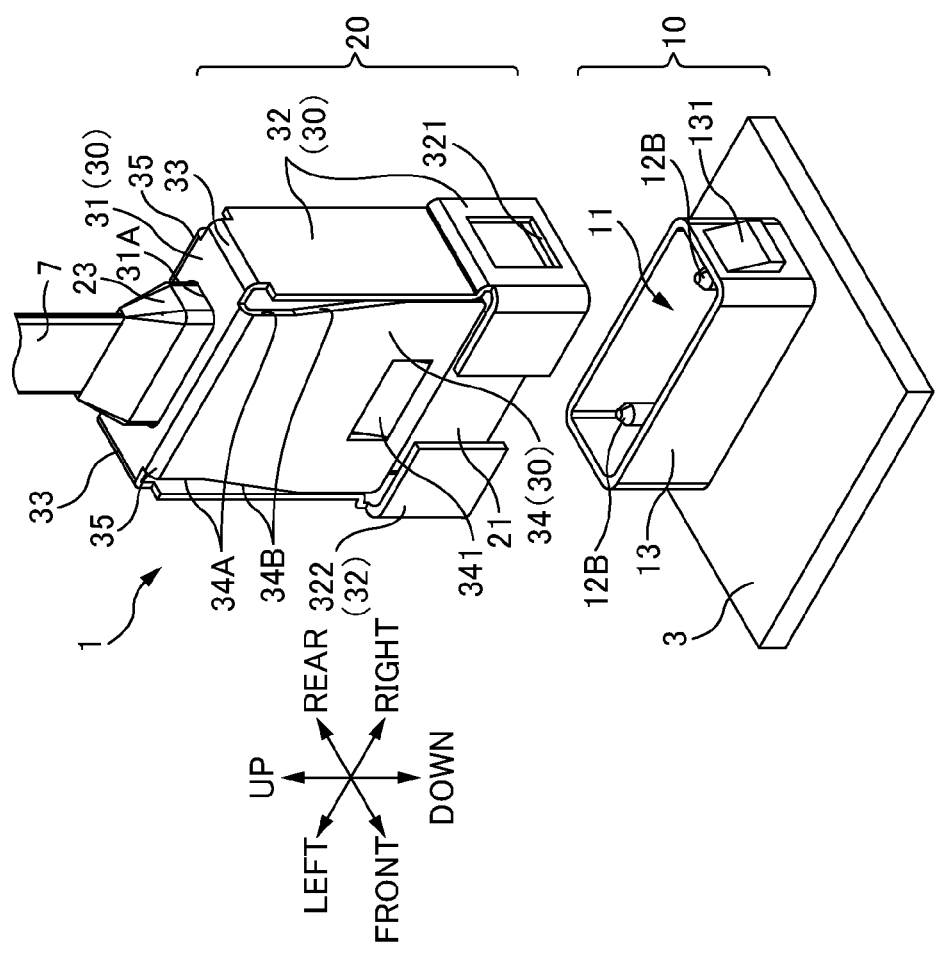

FIGS. 1A and 1B are perspective views of an optical connector device 1. FIG. 1A is a perspective view before connection of an optical connector 20. FIG. 1B is a perspective view when the optical connector 20 has been connected. FIGS. 2A and 2B are cross-sectional views of the optical connector device 1. FIG. 2A is a cross-sectional view before connection of the optical connector 20. FIG. 2B is a cross-sectional view when the optical connector 20 has been connected. In FIGS. 2A and 2B, guide parts 322 on the lower side of the optical connector 20 are not illustrated for the sake of simplifying the figures.

In the following description, the various directions are defined as illustrated in FIG. 1A. That is, the direction perpendicular to the substrate 3 is the "up/down direction"; the side toward the receptacle 10 as viewed from the substrate 3 is "up", and the opposite side is "down". The width direction of the optical fiber tape 7 (the direction in which the plurality of optical fibers are aligned) is the "left/right direction". The direction perpendicular to the up/down direction and the left/right direction is the "front/rear direction", with one side considered the "front" and the opposite side considered the "rear". Note that the up/down direction is also the direction in which the optical connector 20 is attached/detached. In the present embodiment, the optical connector device 1 is constructed to have left-right symmetry; however, for the sake of brevity of explanation, one side in the left/right direction is considered the "right", and the opposite side is considered the "left", as illustrated in the figures. Likewise, for the sake of brevity of explanation, one side in the front/rear direction is considered the "front", and the opposite side is considered the "rear", as illustrated in the figures.

The optical connector device 1 includes a receptacle 10 and an optical connector 20. The receptacle 10 is attached on the upper surface of a substrate 3. The optical connector 20 is attachable to and detachable from the receptacle 10. By attaching the optical connector 20 to the receptacle 10, a photoelectric conversion element 5 (cf. FIGS. 2A and 2B) provided on the substrate 3 is optically connected with optical fibers 8 (cf. FIGS. 2A and 2B).

{Receptacle 10}

The receptacle 10 is a member attached to the substrate 3, and is a member to/from which the optical connector 20 can be attached/detached. A photoelectric conversion element 5 is mounted on the substrate 3. The receptacle 10 is a member that positions the optical connector 20 (particularly, a ferrule 21 of the optical connector 20) with respect to the photoelectric conversion element 5. The receptacle 10 also functions as a connector holder that holds the optical connector 20. The receptacle 10 includes a connector housing part 11 that houses at least a portion (the lower section of the ferrule 21) of the optical connector 20. The receptacle 10 also includes a base body part 12 and a frame body part 13. Herein, the base body part 12 is made of a resin, and the frame body part 13 is made of a metal. Note, however, that the base body part 12 and the frame body part 13 constituting the receptacle 10 may be integrally molded from a resin.

The base body part 12 includes an element housing part 12A, and is a member that is attached to the substrate 3. The lower surface of the base body part 12 serves as a fixing surface (joining surface) to be fixed to the substrate 3. The upper surface of the base body part 12 serves as a contact surface that comes into contact with the ferrule 21. The base body part 12 includes positioning pins 12B. The positioning pins 12B protrude upward from the upper surface of the base body part 12.

The element housing part 12A is a section (space) for housing the photoelectric conversion element 5 provided on the substrate 3. The photoelectric conversion element 5 is an optical element that performs mutual conversion between an electric signal processed on the substrate 3 and an optical signal transmitted through the optical fibers 8. Examples of the photoelectric conversion element 5 include a light emission element that converts an electric signal into an optical signal (e.g. a vertical cavity surface emitting laser that emits light perpendicularly to the substrate 3), and a light reception element that converts an optical signal into an electric signal (e.g. a photodiode). The photoelectric conversion element 5 is mounted on the substrate 3 according to mounting methods such as flip-chip mounting or wire bonding.

A point on which an optical signal is incident or from which an optical signal is emitted (a light emission point or a light reception point) is arranged on the upper surface of the photoelectric conversion element 5. The optical signal is incident on the photoelectric conversion element 5, or emitted from the photoelectric conversion element 5, along the up/down direction perpendicular to the substrate 3.

The base body part 12 includes a receptacle-side lens array 6 in the element housing part 12A. The receptacle-side lens array 6 is arranged on the photoelectric conversion element 5 provided on the substrate 3. When the optical connector 20 is connected to the receptacle 10, the photoelectric conversion element 5 comes into opposition with an optical signal surface 21F of the ferrule 21, and arrays of lenses (the receptacle-side lens array 6 and a ferrule-side lens array 22) are arranged between the photoelectric conversion element 5 and the optical signal surface 21F of the ferrule 21, as illustrated in FIG. 2B. It should be noted that the receptacle-side lens array 6 does not have to be provided.

The positioning pins 12B are pins (positioning sections) to be inserted into respective positioning holes (not illustrated) in the ferrule 21 of the optical connector 20.

By inserting the positioning pins 12B into the positioning holes in the ferrule 21, the optical connector 20 (particularly the ferrule 21) is positioned with respect to the receptacle 10. It should be noted that the base body part 12 is attached to the substrate 3 in a state where the base body part 12 (as well as the positioning pins 12B) is positioned in advance with respect to the photoelectric conversion element 5, and therefore, by inserting the positioning pins 12B into the respective positioning holes in the ferrule 21, the ferrule 21 is positioned with respect to the photoelectric conversion element 5 and the ferrule 21 and the element 5 are optically connected.

The frame body part 13 is a member that connects with the optical connector 20 while housing at least a portion (the lower section of the ferrule 21) of the optical connector 20. The frame body part 13 is formed in a tubular form so as to surround the outer periphery of the base body part 12, and the connector housing part 11 is formed inside the frame body part. The frame body part 13 may be fixed directly to the substrate 3, or may be fixed indirectly to the substrate 3 by being fixed to the base body part 12.

An engagement claw 131 is formed on each of the left and right wall parts of the frame body part 13. The engagement claws 131 constitute engagement sections on the receptacle 10 side which engage with respective engagement holes 321 (connector-side engagement sections) in a fixing member 30 of the optical connector 20. The engagement claws 131 are integrally molded from a resin together with the frame body part 13. The engagement claws 131 are provided so as to protrude outward from the outer wall surface of the frame body part 13. Each engagement claw 131 is formed such that, the lower the position, the more outward it protrudes. Thus, at the time of connecting the optical connector 20, the engagement claw 131 can be easily engaged with the engagement hole 321 in the optical connector 20, but once an engaged state is established, the engagement claw 131 is difficult to remove from the engagement hole 321, and therefore, the optical connector 20 is less prone to be disengaged from the receptacle 10. A method for releasing the engaged state will be described further below.

{Optical Connector 20}

The optical connector 20 is an optical connection component provided at an end section of the optical fibers 8, and is a member that is optically connected to the photoelectric conversion element 5 provided on the substrate 3. The optical connector 20 includes a ferrule 21, a spring part 24, and a fixing member 30.

The ferrule 21 is a member that holds an end section of an optical fiber tape 7 (optical fibers 8) for transmitting an optical signal. Herein, an MT ferrule is used for the ferrule 21. An optical signal surface 21F on which an optical signal is incident, or from which an optical signal is emitted, is formed on an end surface on the lower side of the ferrule 21. When the optical connector 20 is connected to the receptacle 10, the optical signal surface 21F comes into opposition with the photoelectric conversion element 5 on the substrate 3. On the optical signal surface 21F of the ferrule 21, respective end surfaces of a plurality of optical fibers 8 of the optical fiber tape 7 are arranged along the left/right direction.

The end surface of each optical fiber 8 may or may not be exposed on the optical signal surface 21F. A lens array 22 is attached to the optical signal surface 21F of the ferrule 21. The lens array 22 includes a plurality of lenses (not illustrated) aligned in the left/right direction, and each lens is arranged on the optical axis of the optical signal. Note, however, that the lens array 22 does not have to be provided on the optical signal surface 21F of the ferrule 21, and, for example, the optical signal may be directly incident on or emitted from the end surface of each optical fiber 8.

The ferrule 21 includes two positioning holes (not illustrated), a plurality of optical fiber holes 21B, an insertion opening 21C, and a flange part 21D.

The positioning holes in the ferrule 21 are holes (positioning sections) into which the respective positioning pins 12B of the receptacle 10 are inserted. By inserting the positioning pins 12B into the respective positioning holes, the ferrule 21 is positioned with respect to the receptacle 10. Each positioning hole is a hole that is parallel to the up/down direction. The two positioning holes are formed such that they are aligned in the left/right direction so as to sandwich the optical signal surface 21F to/from which an optical signal is input/output.

The optical fiber holes 21B are holes into which the respective end sections of the optical fibers 8 are inserted. The optical fibers 8 constituting the optical fiber tape 7 are inserted into the optical fiber holes 21B. The optical fibers 8 are bonded and fixed to the optical fiber holes 21B by an adhesive that is charged into the ferrule 21 from an adhesive charging window (not illustrated).

The insertion opening 21C is an insertion opening 21C for inserting the optical fibers 8 into the ferrule 21. The insertion opening 21C is opened in the upper end surface of the ferrule 21. An end section of a boot 23 for protecting the optical fiber tape 7 is also inserted into the insertion opening 21C.

The flange part 21D is a section protruding outward from the outer peripheral surface of the ferrule 21's body. In a state before connection as illustrated in FIG. 2A, the ferrule 21 is pressed downward (toward the receptacle 10) by the repulsive force of the spring part 24, and the flange part 21D of the ferrule 21 is in contact with a regulating part 341 of the fixing member 30.

The aforementioned optical signal surface 21F is formed on the lower end surface of the ferrule 21. Further, the ferrule 21's lower end surface surrounding the optical signal surface 21F constitutes a contact surface 21G that comes into contact with the upper surface of the base body part 12 of the receptacle 10, and the positioning holes (not illustrated) into which the positioning pins 12B are fitted are opened in the contact surface 21G. It should be noted that, instead of providing the optical signal surface 21F and the contact surface 21G on the same plane, the optical signal surface 21F may protrude downward from the contact surface 21G.

The spring part 24 is a member that applies a repulsive force between the ferrule 21 and the fixing member 30. The spring part 24 is constituted by a spring (elastic member) that can expand and contract in the up/down direction. The lower end of the spring part 24 is in contact with the ferrule 21, and the upper end of the spring part 24 is in contact with an upper plate part 31 of the fixing member 30.

As illustrated in FIG. 2A, in a state where the flange part 21D of the ferrule 21 is engaged with the regulating part 341 (described later) of the fixing member 30, the ferrule 21 is pressed downward (toward the receptacle 10) from the fixing member 30 by the repulsive force of the spring part 24. At the time of contact of the optical connector 20, as illustrated in FIG. 2B, the contact surface 21G of the ferrule 21 contacts the receptacle 10 (more specifically, the upper surface of the base body part 12), and the ferrule 21 receives an upward force from the receptacle 10; this force causes the spring part 24 to contract and the ferrule 21 to relatively move upward with respect to the fixing member 30, thus creating anon-contact state between the flange part 21D of the ferrule 21 and the regulating part 341 of the fixing member 30. Even in the state illustrated in FIG. 2B, the spring part 24 continues to press the ferrule 21 with a predetermined force. In this way, the spring part 24 functions as a floating mechanism that retractably holds the ferrule 21.

Figure 5A:
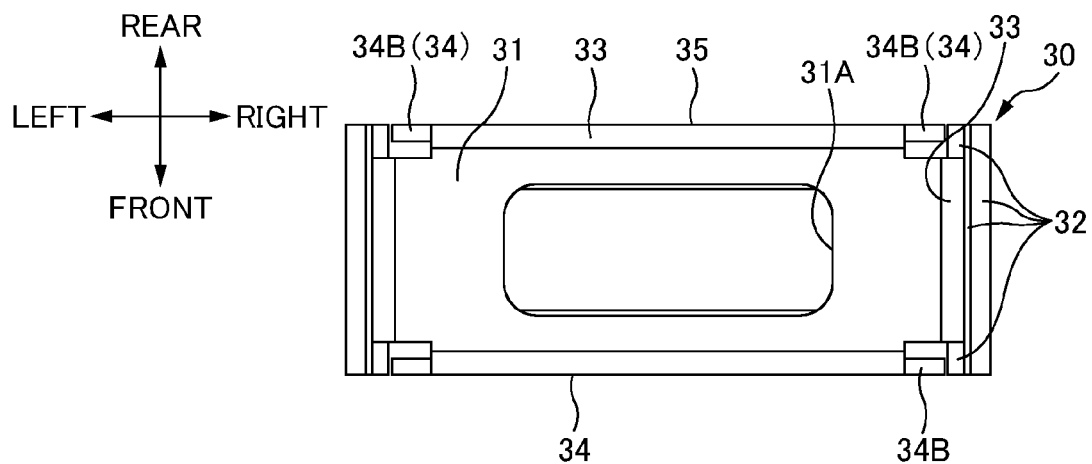
FIG. 5A is a diagram illustrating a fixing member 30 as viewed from above.

Next, the fixing member 30 is described with reference to FIGS. 1A, 1B, 2A, 2B, and 5A. FIG. 5A is a diagram illustrating the fixing member 30 as viewed from above. It should be noted that, in FIG. 5A (and FIGS. 5B and 5C), the guide parts 322 are not illustrated, as in FIG. 4.

The fixing member 30 is a member for fixing the optical connector 20 to the receptacle 10. The fixing member 30 is a member formed by bending an elastically-deformable plate-shaped member made of a metal. The fixing member 30 includes an upper plate part 31, a pair of first side plate parts 32, and a pair of second side plate parts 34. A first bent part 33 is formed between the upper plate part 31 and each first side plate part 32, and a second bent part 35 is formed between the upper plate part 31 and each second side plate part 34.

The upper plate part 31 is a section that is substantially parallel to the substrate 3, and is a section that is arranged above the ferrule 21. The upper plate part 31 functions as a section for pressing the ferrule 21 downward (toward the receptacle 10) by means of the spring part 24; the lower surface of the upper plate part 31 is in contact with the upper end of the spring part 24. A through hole 31A is formed in the upper plate part 31. The optical fiber tape 7 and the boot 23 are passed through this through hole 31A. The upper plate part 31 has a rectangular shape extending in the left/right direction. The front edge and the rear edge, which constitute the long sides of the rectangular upper plate part 31, are substantially parallel to the left/right direction, and the front edge and the rear edge are arranged so as to be aligned in the front/rear direction across the through hole 31A. The right edge and the left edge, which constitute the short sides of the rectangular upper plate part 31, are substantially parallel to the front/rear direction, and the right edge and the left edge are arranged so as to be aligned in the left/right direction across the through hole 31A.

The first side plate parts 32 are plate-shaped sections formed so as to extend downward from the respective left edge and right edge of the upper plate part 31 (i.e., from the respective short sides of the rectangular upper plate part 31). Stated differently, each first side plate part 32 is a cantilevered section supported on its upper side (on the upper plate part 31 side). The pair of first side plate parts 32 opposes one another in the left/right direction. The first side plate parts 32 are constituted by the same metal plate as the upper plate part 31, and the first side plate parts 32 (and the first bent parts 33) are formed by being bent with respect to the upper plate part 31. Each first side plate part 32 is arranged so as to leave a gap in the left/right direction between it and a side surface of the ferrule 21. When the optical connector 20 is connected, the frame body part 13 of the receptacle 10 enters the gaps between the respective first side plate parts 32 and the ferrule 21.

Each first sideplate part 32 has an engagement hole 321. These engagement holes 321 are engagement sections on the optical connector 20 side which engage with the respective engagement claws 131 (receptacle-side engagement sections) of the receptacle 10. Therefore, each first side plate part functions as an engagement side plate part having a connector-side engagement section that engages with the engagement claw 131 formed on a side surface of the receptacle 10. The engagement hole 321 is formed as a hole penetrating the first side plate part 32, but the engagement hole only needs to engage with the engagement claw 131 of the receptacle 10, and so, the engagement hole may be a non-through hole (a recess) if the first side plate part 32 is thick.

The dimension (width) of the first side plate part 32 in the front/rear direction is longer than the dimension (width) of the first bent part 33 in the front/rear direction. Thus, the inner surface of each of the front edge and the rear edge of the first side plate part 32 opposes an edge (left edge or right edge) of the second side plate part 34.

Guide parts 322 are formed on the lower side of each first side plate part 32. The guide parts 322 are sections formed by being bent from the first side plate part 32, and are sections to be guided by respective side surfaces of the receptacle 10. By arranging the guide parts 322 on the lower side (the receptacle 10 side) of the optical connector 20, the optical connector 20 can be connected to the receptacle 10 while the guide parts 322 are guided along the side surfaces of the receptacle 10, and thus, the optical connector 20 can be easily positioned with respect to the receptacle 10.

The first bent part 33 is a bent section that connects the upper plate part 31 and the first sideplate part 32. The first bent parts 33 are elastically deformable, and thus, the pair of first side plate parts 32 can be displaced in respective directions in which they are spread open (refer to the arrows in FIG. 4B). It should be noted that the dimension (width) of each first bent part 33 in the front/rear direction may be further narrowed by making cuts in the front edge and rear edge of the first bent part 33. Narrowing the dimension (width) of the first bent part 33 in the front/rear direction weakens the springiness of the first bent part 33, and this allows the pair of first side plate parts 32 to be easily displaced in respective directions in which they are spread open, thus making it easy to release the engaged state.

The second sideplate parts 34 are plate-shaped sections formed so as to extend downward from the respective front edge and rear edge of the upper plate part 31 (i.e., from the respective long sides of the rectangular upper plate part 31). The pair of second side plate parts 34 opposes one another in the front/rear direction. The second side plate parts 34 are constituted by the same metal plate as the upper plate part 31, and the second side plate parts 34 (and the second bent parts 35) are formed by being bent with respect to the upper plate part 31.

Each second side plate part 34 has a regulating part 341. As illustrated in FIG. 2A, the regulating part 341 is a section formed like a claw protruding inward from the second side plate part 34, and restricts the lower limit position of the ferrule 21 by contacting the flange part 21D of the ferrule 21.

The dimension (width) of the second side plate part 34 in the left/right direction is narrower than the distance between the pair of first side plate parts 32 in the left/right direction. Thus, a gap is formed between the inner surface of the first sideplate part 32 (more specifically, the inner surface of each of the front edge and the rear edge of the first side plate part 32) and each edge (left edge or right edge) of the second side plate part 34.

On the upper side of the second side plate part 34, the dimension (width) of the second side plate part 34 in the left/right direction is constant. Stated differently, a straight-line section 34A that is substantially parallel to the up/down direction is formed along each edge (left edge or right edge) on the upper side of the second side plate part 34. In the straight-line section 34A formed on the edge of the second side plate part 34, the gap between the inner surface of the first side plate part 32 (more specifically, the inner surface of each of the front edge and the rear edge of the first side plate part 32) and the edge in the straight-line section 34A of the second side plate part 34 has a constant distance.

On the lower side of the straight-line section 34A, the dimension (width) of the second side plate part 34 in the left/right direction becomes longer (wider) toward the lower side. Stated differently, a sloped section 34B that is sloped with respect to the up/down direction is formed on the lower side of the straight-line section 34A of the second sideplate part 34. In the sloped section 34B formed on the edge of the second side plate part 34, the gap between the inner surface of the first sideplate part 32 (more specifically, the inner surface of each of the front edge and the rear edge of the first side plate part 32) and the edge in the sloped section 34B of the second side plate part 34 becomes narrower toward the lower side (cf. FIG. 4A). Thus, by inserting a tip end section of a tool into the gap on the inner side of each first side plate part 32, each of the pair of first side plate parts 32 spreads outward, and the engaged state can be released (described later; cf. FIG. 4B).

The second bent part 35 is a bent section that connects the upper plate part 31 and the second side plate part 34. The dimension (width) of the second bent part 35 in the left/right direction is the same as the width of the upper section of the second side plate part 34, but is narrower than the dimension of the upper plate part 31 in the left/right direction, and is also narrower than the distance in the left/right direction between the pair of first side plate parts 32. Thus, the gap between the inner surface of the first side plate part 32 and each edge (left edge or right edge) of the second side plate part 34 is opened on the upper side. In this way, the tip end section of a tool can be inserted from the upper side of each gap.

{Removal Tool 40}

At the time of removing the optical connector 20 from the state illustrated in FIG. 1B, it is necessary to release the engaged state of the optical connector with the receptacle 10 by spreading the pair of first side plate parts 32 of the fixing member 30 outward. However, in cases where, for example, other elements are mounted around the receptacle 10, it is difficult to release the engaged state by spreading the first side plate parts 32 outward with the fingertips. Even with methods using tools to release the engaged state, if the method involves hooking the lower edge of the first side plate part 32 with the tip end section of a tool from outside the first side plate part 32 and forcibly spreading open the first side plate part 32 outward, the releasing task will be difficult in cases where other elements are mounted around the receptacle 10.

Accordingly, in the present embodiment, a removal tool 40 is configured so as to spread the first side plate parts 32 outward from the "inner side", rather than from the "outer side" of the first sideplate parts 32 of the optical connector 20.

Figure 3:
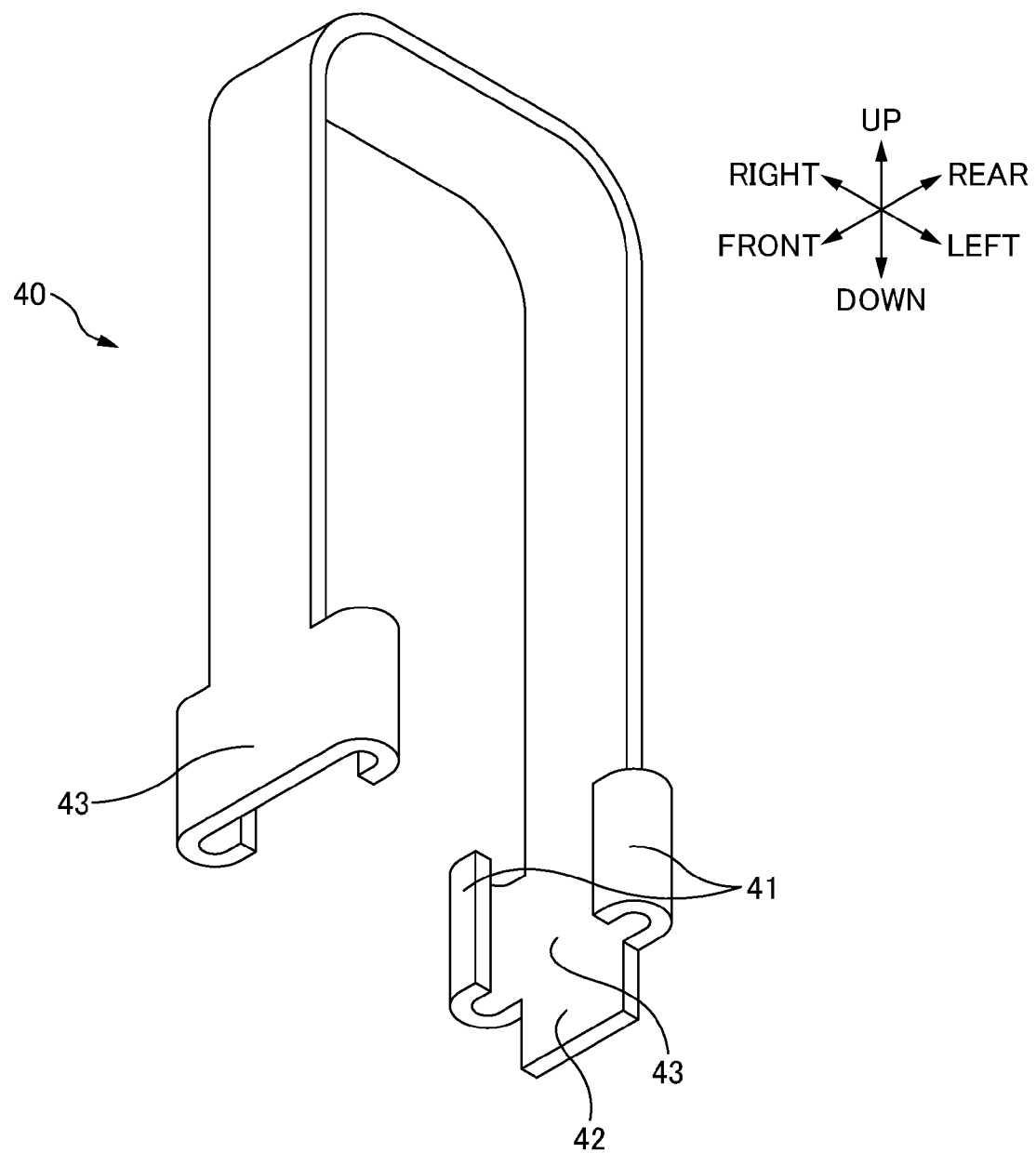
FIG. 3 is an overall perspective view of a removal tool 40.
Figure 5B:
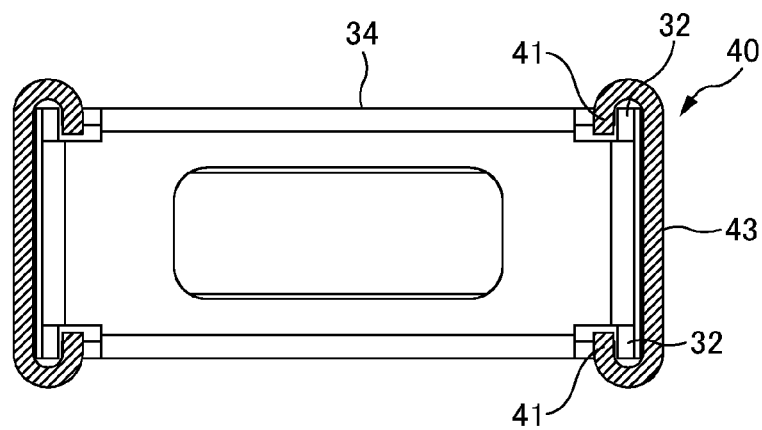
FIG. 5B is a diagram illustrating the positions of the release claws 41 of the removal tool 40 with respect to the fixing member 30 of FIG. 5A.

FIG. 3 is an overall perspective view of a removal tool 40. FIGS. 4A and 4B are conceptual diagrams of the respective positions of release claws 41 of the removal tool 40 (tip end sections of the release claws 41) as viewed from the front side. FIG. 4A is a conceptual diagram illustrating how each release claw 41 of the removal tool 40 is inserted into a gap on the inner side of each first side plate part 32 of the optical connector 20. FIG. 4B is a conceptual diagram illustrating how the engaged state is released by spreading each first side plate part 32 outward from the inner side of the first side plate part 32 by each release claw 41 of the removal tool 40. It should be noted that, in FIGS. 4A and 4B, the guide parts 322 (cf. FIGS. 1A and 1B) on the lower side of the first side plate parts 32 are not illustrated in order to illustrate the engaged state and the released state of the engagement claws 131. FIG. 5B is a diagram illustrating the positions of the release claws 41 of the removal tool 40 with respect to the fixing member 30 of FIG. 5A.

In the following description, the various directions are defined as illustrated in FIG. 3. These directions correspond to the orientation of the removal tool 40 when the removal tool 40 is used with respect to the optical connector device 1 illustrated in FIG. 1A.

The removal tool 40 is a tool for removing the optical connector 20 from the receptacle 10. The removal tool 40 includes release claws 41 and a guide part 42.

The release claw 41 is a section to be inserted into the gap on the inner side of the first side plate part 32 of the fixing member 30 of the optical connector 20 (herein, the gap between the first side plate part 32 and the left edge or right edge of the second side plate part 34). The thickness of the tip end section of the release claw 41 (the thickness, in the left/right direction, of the release claw 41 in FIG. 4A) is thinner than the gap between the first side plate part 32 and the second side plate part 34 in the straight-line section 34A, and is thicker than the narrowest gap between the first side plate part 32 and the second side plate part 34 in the sloped section 34B.

As described above, each gap between the first side plate part 32 and an edge (left edge or right edge) of the second side plate part 34 is opened on the upper side, and thus, as illustrated in FIG. 4A, the release claws 41 of the removal tool 40 can be inserted from the upper side of the respective gaps. Thus, it is easy to insert the release claws 41 into the gaps on the inner side of the first side plate parts 32.

By further sliding the removal tool 40 downward (toward the substrate 3) from the state illustrated in FIG. 4A, the release claws 41 come into contact with the sloped sections 34B on the edges (left edge and right edge) of the second side plate parts 34. By further sliding the removal tool 40 downward (toward the substrate 3), the first side plate parts 32 are spread outward by means of the release claws 41 by the sloped sections 34B on the edges (left edge and right edge) of the second side plate parts 34 as illustrated in FIG. 4B, and thus, the engagement holes 321 in the first side plate parts 32 disengage from the respective engagement claws 131 of the receptacle 10, and the engaged state is released. When the engaged state is released, the optical connector 20 is pressed upward from the receptacle 10 by the repulsive force of the spring part 24 of the optical connector 20, and thus, the optical connector 20 can be easily removed from the receptacle 10.

The position (i.e., the position in the up/down direction) where each release claw 41 contacts the sloped section 34B on the edge (left edge or right edge) of the second side plate part 34 is above the lower edge (the section that engages with the engagement claw 131) of the engagement hole 321. Therefore, each first side plate part 32 receives a force from the release claws 41 at a position closer to the first bent part 33 than the engagement position. Thus, the engaged state can be released even by slightly displacing the first side plate part 32 with the release claws 41.

As illustrated in FIG. 3, each pair of release claws 41 aligned in the front/rear direction is connected integrally by a connecting part 43. The removal tool 40 has four release claws 41; therefore, the two pairs of release claws 41 are connected integrally by respective connecting parts 43. Stated differently, the removal tool 40 has two connecting parts 43. The two connecting parts 43 can be opened and closed in the left/right direction (i.e., are relatively movable in the left/right direction). Thus, the two release claws 41 aligned in the left/right direction are configured so as to be relatively movable in the left/right direction; so, when the removal tool 40 is slid downward (toward the substrate 3), each pair of release claws 41 can be moved outward along the respective sloped sections 34B on the edges (left edge and right edge) of each second side plate part 34. More specifically, the left release claw 41 (first release claw) and the right release claw 41 (second release claw) in FIG. 4B are configured so as to be relatively movable in the left/right direction (i.e., the direction in which the pair of first side plate parts 32 is aligned).

As illustrated in FIGS. 3 and 5B, the release claws 41 are formed in a U-shape on respective front and rear edges of the connecting part 43. As illustrated in FIG. 5B, when using the removal tool 40, an operator inserts the respective tip end sections of the U-shaped release claws 41 into the respective gaps on the inner side of each first side plate part 32 while bringing the connecting parts 43 into opposition with the respective first side plate parts 32 from the outer sides thereof. At this time, the U-shaped release claws 41 surround the front and rear edges of each first side plate part 32 from the outside, and the tip end section of each release claw 41 is inserted into the gap on the inner side of the first side plate part 32. Thus, it is possible to spread each first side plate part 32 outward from the inner side of the first side plate part 32 of the optical connector 20.

Because each pair of release claws 41 aligned in the front/rear direction is connected by the connecting part 43, when the release claws 41 are inserted into the gaps on the inner side of each first side plate part 32, the pair of release claws 41 sandwiches and holds the first side plate part 32 from the front and rear thereof. Thus, the release claws 41 are less prone to disengage from the gaps on the inner side of each first side plate part 32.

The guide part 42 is a section for guiding the removal tool 40. The guide part 42 has a surface parallel to the up/down direction, and slidably guides the removal tool 40 in the up/down direction. The guide part 42 is formed so as to extend more downward than the release claws 41. Thus, the guide part 42 can be brought into contact with the optical connector 20 before the release claws 41 are inserted into the gaps on the inner side of each first side plate part 32.

When using the removal tool 40, an operator first brings the inner surface of the guide part 42 into contact with the first side plate part 32 (in this example, the first sideplate part 32 on the left), which is a side surface of the optical connector 20, to position the removal tool 40 with respect to the optical connector 20 in the left/right direction. Next, the operator slides the removal tool 40 downward while maintaining the contact between the guide part 42 and the first side plate part 32, and, as illustrated in FIG. 5B, inserts the four release claws 41 into the respective gaps on the inner side of the respective first side plate parts 32. At this time, because the removal tool 40 has been positioned in advance with respect to the optical connector 20 in the left/right direction by the guide part 42, it is easy to insert the release claws 41 into the respective gaps on the inner side of the first side plate parts 32.

Herein, the guide part 42 is configured so as to be parallel to the first side plate part 32 so that it can be guided by the first side plate part 32 of the optical connector 20. Note, however, that the guide part 42 only needs to be configured so that it can be guided by a side surface of the optical connector device 1 (the receptacle 10 and the optical connector 20), and is thus not limited to the shape and function illustrated in FIG. 3. For example, the guide part 42 may be configured so as to be guided by another section of the fixing member 30 of the optical connector 20, or may be configured so as to be guided by another member (e.g. the ferrule 21) of the optical connector 20. Alternatively, the guide part 42 may be configured so as to be guided by a side surface of the receptacle 10.

Further, herein, the guide part 42 is formed so as to extend downward from the lower edge of the connecting part 43. Note, however, that the guide part 42 only needs to be configured so that it can be guided by a side surface of the optical connector device 1 (the receptacle 10 and the optical connector 20), and thus, the position of the guide part 42 is not limited to the position illustrated in FIG. 3.

Figure 5C:
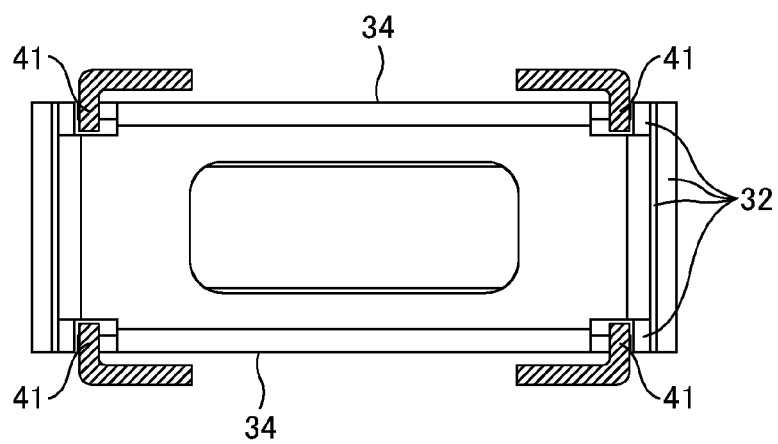
FIG. 5C is a diagram illustrating a modified example of the removal tool 40.

FIG. 5C is a diagram illustrating a modified example of the removal tool 40. FIG. 5C also illustrates the respective positions of the release claws 41 of the removal tool 40 with respect to the fixing member 30 of FIG. 5A. As illustrated in this figure, the two release claws 41 aligned in the front/rear direction do not have to be connected. It should be noted that, also in this modified example, the two release claws 41 aligned in the left/right direction are configured so as to be relatively movable in the left/right direction. Thus, when the removal tool 40 is slid downward (toward the substrate 3), each pair of release claws 41 can be moved outward along the respective sloped sections 34B on the edges (left edge and right edge) of each second side plate part 34.

{Summary}

The aforementioned fixing member 30 includes: an upper plate part 31 for pressing a ferrule 21 toward a receptacle 10; and a pair of first side plate parts 32. Each first side plate part 32 is formed so as to extend from the upper plate part toward a substrate 3, and has an engagement hole 321 (connector-side engagement section) that engages with an engagement claw 131 (receptacle-side engagement section) formed on a side surface of the receptacle 10. At the time of connecting an optical connector 20, the engagement holes 321 of the optical connector 20 are engaged with the engagement claws 131 of the receptacle 10. Therefore, to remove the optical connector 20, it is necessary to release the engaged state of the optical connector with the receptacle 10 by spreading the pair of first side plate parts 32 of the fixing member 30 outward. However, if there are other members (e.g. elements mounted on the substrate) around the receptacle 10, it is difficult to spread the first side plate parts 32 outward from the outer side of the first side plate parts 32.

To address this problem, in the aforementioned fixing member 30, as illustrated in FIGS. 4A and 4B, the engaged state in which the engagement hole 321 is engaged with the engagement claw 131 can be released by inserting an engagement claw (end section) of a removal tool 40 (tool) into a gap between each first side plate part 32 and a second side plate part 34 (member) that is arranged between the pair of first sideplate parts 32, and spreading the first side plate parts 32 outward. In this way, the first side plate parts 32 can be spread outward from the "inner side" rather than from the "outer side" of the first side plate parts 32, and thus, the engaged state of the fixing member can be released easily, even in a small space.

In the foregoing embodiment, the gap between the first side plate part 32 and the second side plate part 34 becomes narrower toward the lower side (toward the substrate) (cf.

FIGS. 4A and 4B). Thus, by sliding the release claws 41 of the removal tool 40, which have been inserted into the respective gaps, toward the lower side (toward the substrate), the first side plate parts 32 can be spread outward and the engaged state can be released.

Others:

The foregoing embodiments are for facilitating the understanding of the present invention, and should not be construed as limiting the present invention. The present invention may be modified and/or improved without departing from the gist thereof, and it goes without saying that the present invention encompasses any equivalents thereof.

REFERENCE SIGNS LIST

1: Optical connector device;
3: Substrate;
5: Photoelectric conversion element;
6: Receptacle-side lens array;
7: Optical fiber tape;
8: Optical fiber;
10: Receptacle;
11: Connector housing part;
12: Base body part;
12A: Element housing part; 12B: Positioning pin (positioning section);
13: Frame body part;
131: Engagement claw (receptacle-side engagement section);
20: Optical connector;
21: Ferrule;
21B: Optical fiber hole; 21C: Insertion opening; 21D: Flange part; 21F: Optical signal surface; 21G: Contact surface;
22: Lens array;
23: Boot;
24: Spring part;
30: Fixing member (optical-connector fixing member);
31: Upper plate part; 31A: Through hole;
32: First side plate part (engagement side plate part);
321: Engagement hole (connector-side engagement section);
322: Guide part;
33: First bent part;
34: Second side plate part (member); 341: Regulating part;
34A: Straight-line section; 34B: Sloped section;
35: Second bent part;
40: Removal tool;
41: Release claw (end section of tool);
42: Guide part;
43: Connecting part.

What is claimed is:

1. An optical-connector fixing member comprising:
an upper plate part configured to press, toward a receptacle, a ferrule that holds an end section of an optical fiber;
a pair of engagement side plate parts extending from said upper plate part, each said engagement side plate part having a connector-side engagement section configured to engage with a receptacle-side engagement section formed on a side surface of said receptacle; and
a pair of gaps, each gap being provided between each said engagement side plate part and a member that is arranged between said pair of engagement side plate parts in an engaged state, in which said connector-side engagement section is engaged with said receptacle-side engagement section,
each gap being opened on the upper side of the gap and configured such that a release claw of a tool can be inserted into the gap on the inner side of the engagement side plate part,
each gap being configured such that the engaged state is releasable when the tool is inserted into the gap toward said receptacle and spreads each said engagement side plate part outward,
the upper plate part having a pair of penetrating spaces configured for insertion of respective release claws of the tool into the gap from the upper side of said upper plate part.

2. The optical-connector fixing member according to claim 1, wherein said gap becomes narrower toward said receptacle.

3. An optical connector comprising:
a ferrule configured to hold an end section of an optical fiber; and
a fixing member that fixes said ferrule in a state where said ferrule is arranged between said fixing member and a receptacle, wherein:
said fixing member comprises:
an upper plate part configured to press said ferrule toward said receptacle;
a pair of engagement side plate parts extending from said upper plate part toward said receptacle, each said engagement side plate part having a connector-side engagement section configured to engage with a receptacle-side engagement section formed on a side surface of said receptacle; and
a pair of gaps, each gap being provided between each said engagement side plate part and a member that is arranged between said pair of engagement side plate parts in an engaged state, in which said connector-side engagement section is engaged with said receptacle-side engagement section,
each gap being opened on the upper side of the gap and configured such that a release claw of a tool can be inserted into the gap on the inner side of the engagement side plate part,
each gap being configured such that the engaged state is releasable when the tool is inserted into the gap toward said receptacle and spreads each said engagement side plate part outward,
the upper plate part having a pair of penetrating spaces configured for insertion of respective release claws of the tool into the gap from the upper side of said upper plate part.

4. An optical connector device comprising:
a receptacle; and
an optical connector that is attachable to and detachable from said receptacle, wherein:
said optical connector comprises:
a ferrule configured to hold an end section of an optical fiber, and
a fixing member that fixes said ferrule in a state where said ferrule is arranged between said fixing member and said receptacle;
said fixing member comprises:
an upper plate part configured to press said ferrule toward said receptacle;
a pair of engagement side plate parts extending from said upper plate part toward said receptacle, each said engagement side plate part having a connector-side engagement section configured to engage with a receptacle-side engagement section formed on a side surface of said receptacle; and a pair of gaps, each being provided between each said engagement side plate part and a member that is arranged between said pair of engagement side plate parts in an engaged state, in which said connector-side engagement section is engaged with said receptacle-side engagement section, each gap being opened on the upper side of the gap and configured such that a release claw of a tool can be inserted into the gap on the inner side of the engagement side plate part, each gap being configured such that the engaged state is releasable when the tool is inserted into the gap toward said receptacle and spreads each said engagement side plate part outward, the upper plate part having a pair of penetrating spaces configured for insertion of respective release claws of the tool into the gap from the upper side of said upper plate part.

* * * * *